(12) United States Patent
Benedetti et al.

(10) Patent No.: US 9,419,423 B2
(45) Date of Patent: Aug. 16, 2016

(54) BUS BAR FOR ELECTRICAL POWER DISTRIBUTION IN A POWER DISTRIBUTION SWITCHBOARD

(71) Applicant: ABB S.p.A., Milan (IT)

(72) Inventors: Pierceleste Benedetti, Orsenigo (IT); Daniele Cagliani, Molteno (IT); Andrea Tagliabue, Seregno (IT)

(73) Assignee: ABB S.p.A., Milan (IT)

( * ) Notice: Subject to any disclaimer, the term of this patent is extended or adjusted under 35 U.S.C. 154(b) by 0 days.

(21) Appl. No.: 14/282,602

(22) Filed: May 20, 2014

(65) Prior Publication Data

US 2014/0342585 A1    Nov. 20, 2014

(30) Foreign Application Priority Data

May 20, 2013   (EP) .................................... 13168447

(51) Int. Cl.

| | |
|---|---|
| *H01R 25/00* | (2006.01) |
| *H02G 5/02* | (2006.01) |
| *H01R 25/14* | (2006.01) |
| *H01B 5/02* | (2006.01) |
| *H02B 1/21* | (2006.01) |
| *H02G 5/10* | (2006.01) |

(52) U.S. Cl.
CPC ................ *H02G 5/02* (2013.01); *H01R 25/14* (2013.01); *H01B 5/02* (2013.01); *H02B 1/21* (2013.01); *H02G 5/10* (2013.01)

(58) Field of Classification Search
CPC ............................... H01R 25/14; H01R 25/16
USPC .................................................. 439/110–112
See application file for complete search history.

(56) References Cited

U.S. PATENT DOCUMENTS

| | | | | |
|---|---|---|---|---|
| 3,894,170 | A * | 7/1975 | Schinzel | ...................... 174/99 B |
| 5,803,755 | A * | 9/1998 | Kuchar et al. | ................. 439/110 |
| 5,847,321 | A | 12/1998 | Carle et al. | |
| 6,616,465 | B1 | 9/2003 | Fontana et al. | |
| 6,994,571 | B2 * | 2/2006 | Hoffmann | ...................... 439/110 |
| 8,147,257 | B2 * | 4/2012 | Bury et al. | ..................... 439/110 |

(Continued)

FOREIGN PATENT DOCUMENTS

| | | |
|---|---|---|
| EP | 0 681 355 A1 | 11/1995 |
| EP | 2 400 610 A2 | 12/2011 |

(Continued)

OTHER PUBLICATIONS

European Search Report dated Oct. 8, 2013.

*Primary Examiner* — Chandrika Prasad
(74) *Attorney, Agent, or Firm* — Taft Stettinius & Hollister LLP

(57) ABSTRACT

A bus bar for electric power distribution switchboard is disclosed, which can include a conducting body, which longitudinally extends along a principal axis and, which, seen in a transversal cross-section, has a first side and a second side transversally connected by a third side and a fourth side. The body has, on the first side, at least a first slot and a second separated slot, and wherein the first slot has a first bottom portion from which a first lateral wall and a second lateral wall protrude transversally facing to each other, and the second slot has a second bottom portion from which a third lateral wall and a fourth lateral wall protrude transversally facing to each other. Each of the first bottom portion and the second bottom portion includes two substantially straight tracts, which form an angle of less than 180° between them.

22 Claims, 9 Drawing Sheets

(56) References Cited

U.S. PATENT DOCUMENTS

2003/0176088 A1* 9/2003 Truggelmann ............... 439/110
2012/0222881 A1   9/2012 Van Dooren et al.

FOREIGN PATENT DOCUMENTS

EP          2 495 832 A1    9/2012
WO     WO 00/27007 A1       5/2000

* cited by examiner

BUS BAR FOR ELECTRICAL POWER DISTRIBUTION IN A POWER DISTRIBUTION SWITCHBOARD

RELATED APPLICATION(S)

This application claims priority under 35 U.S.C. 119 to European Application No. 13168447.4 filed on May 20, 2013 in Europe, the contents of which are hereby incorporated by reference in its entirety.

FIELD

The present disclosure relates to a bus bar for electrical power distribution.

BACKGROUND INFORMATION

It is known that distribution switchboards for distributing electric power to a plurality of electrical devices, such as circuit breakers or other switching devices, can use a system of mutually parallel bus bars.

Each one of the bars can be electrically connected to a corresponding phase of the electric power supply mains, wherein the connection between the bus bars and the devices installed into the switchboard can be provided by means of adapter conductors, such as for example laminae, which can be shaped appropriately according to the type of device.

Bus bars, according to the functions that they perform in the practical application, have a few basic characteristics; for example, bus bars can have a simple and functional constructive structure, which can allow flexibility in assembly and coupling to other conducting or insulating elements.

For example, it is known to use flat bars with a solid rectangular transverse cross-section.

It is also known to use bus bars whose transverse cross-sections can be shaped to facilitate coupling to other bars or to supporting and/or insulation elements; these elements can be used to fix the bus bars to supporting structures and to assist them in withstanding the electrodynamic stresses.

For example, shaped bus bars are known, for example, with a body having, on an upper side, two C-shaped slots for receiving therein a corresponding fixing means. The lower side of these bus bars can have a central portion, for example, a portion extending over a corresponding portion between the two upper C-slots, which can be constituted by a large thickness portion of conducting material.

It is known that bus bars can heat significantly when current is flowing through the bus bar and the dissipation of electric energy in form of heat can limit the current conducting capability of the bus bars.

Furthermore, considering two known bus bars placed adjacent to each other, relevant electromagnetic forces can be generated between such bus bars during the current flowing therethrough. These electromagnetic forces can jeopardize the electrical conducting performances of the bus bars. For example, this situation can occur when a fault current is generated through the bus bars, such as a current due to a short-circuit. The generated electromagnetic forces, for example, can limit the rated short-time current ($I_{cw}$) which the bus bars can bear.

The generated electromagnetic forces can also imply the use of a plurality of large dimensioned insulating supporting elements for the bus bars.

SUMMARY

A bus bar for electric power distribution is disclosed, the bus bar comprising: a body made of conducting material which longitudinally extends along a principal axis and which, seen in a transversal cross-section, has a first side and a second side transversally connected to each other by a third side and a fourth side; the body having on the first side, at least a first slot and a second slot which are separated from each other; the first slot having a first bottom portion from which a first lateral wall and a second lateral wall protrude transversally facing to each other, and the second slot having a second bottom portion from which a third lateral wall and a fourth lateral wall protrude transversally facing to each other; wherein each of the first bottom portion and the second bottom portion includes two substantially straight tracts which form an angle of less than 180° between them; wherein the third lateral wall is adjacent to the second lateral wall along a transversal extension of the body with respect to the principal axis; and wherein the body has, on the second side, at least one cavity extending at least over a corresponding portion of the body, which extends between the second lateral wall and the third lateral wall.

An electrical power distribution switchboard is disclosed, the switchboard comprising: at least one bus bar, the at least one bus bar comprising: a body made of conducting material which longitudinally extends along a principal axis and which, seen in a transversal cross-section, has a first side and a second side transversally connected to each other by a third side and a fourth side; the body having on the first side, at least a first slot and a second slot which are separated from each other and adapted for coupling with a corresponding fixing means; the first slot having a first bottom portion from which a first lateral wall and a second lateral wall protrude transversally facing to each other, and the second slot having a second bottom portion from which a third lateral wall and a fourth lateral wall protrude transversally facing to each other; wherein each of the first bottom portion and the second bottom portion includes two substantially straight tracts which form an angle of less than 180° between them; wherein the third lateral wall is adjacent to the second lateral wall along a transversal extension of the body with respect to the principal axis; and wherein the body has, on the second side, at least one cavity extending at least over a corresponding portion of the body, which extends between the second lateral wall and the third lateral wall.

BRIEF DESCRIPTION OF THE DRAWINGS

The disclosure is explained below with reference to the exemplary embodiments shown in the drawings. In the drawings.

DETAILED DESCRIPTION

Figure 1:
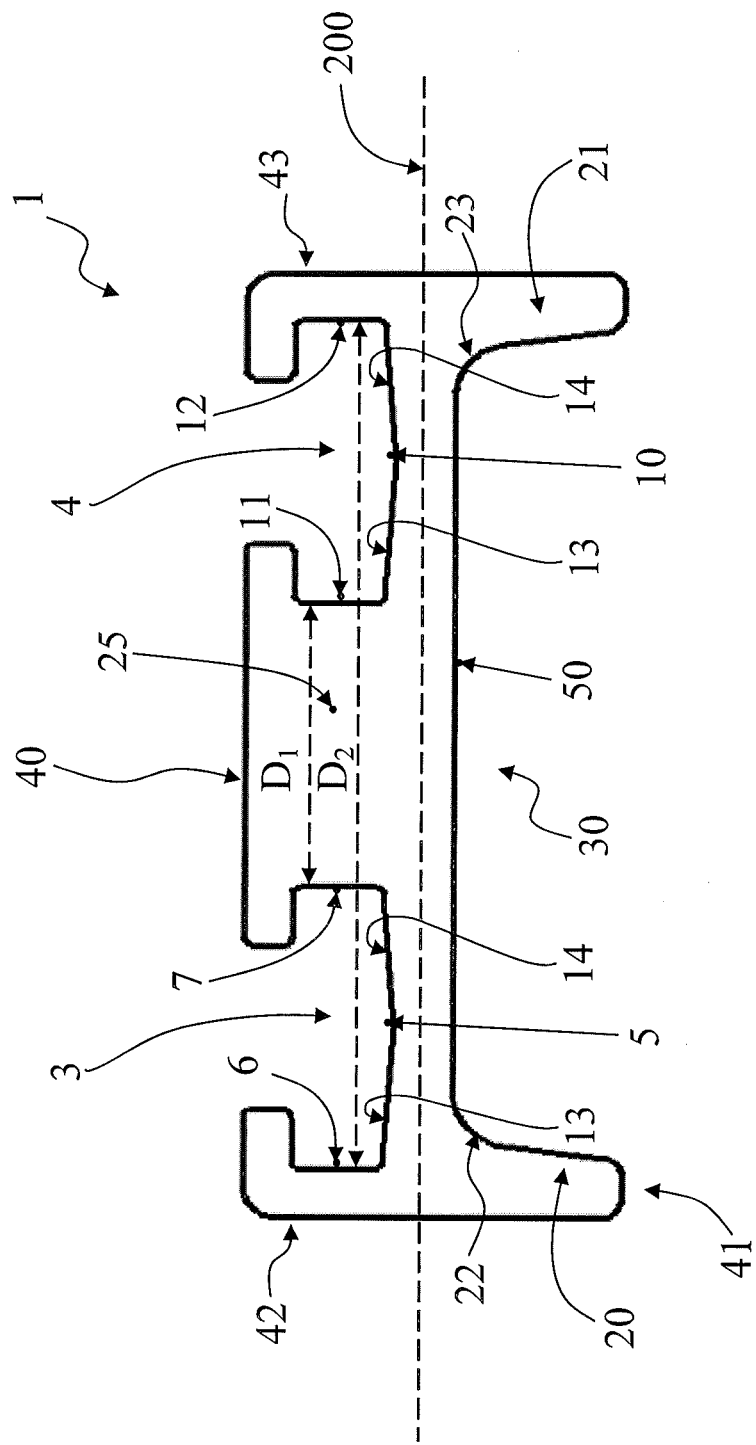
FIG. 1 is a sectional view of an exemplary bus bar according to the present disclosure.

In accordance with an exemplary embodiment, a bus bar for electric power distribution is disclosed, which can include a body made of conducting material which longitudinally extends along a principal axis and which, seen in a transversal cross-section, has a first side and a second side transversally connected to each other by a third side and a fourth side. The body can have, on the first side, at least a first slot and a second slot which can be separated from each other and adapted for coupling with corresponding fixing means, the first slot can have a first bottom portion from which a first lateral wall and a second lateral wall protrude transversally facing to each other, and the second slot can have a second bottom portion from which a third lateral wall and a fourth lateral wall protrude transversally facing to each other, wherein each one of the first bottom portion and the second bottom portion can include two substantially straight tracts, which can form an angle of less than 180° between them. The third lateral wall can be adjacent to the second lateral wall along a transversal extension of the body with respect to the principal axis. The body can have, on the second side, at least one cavity extending at least over a corresponding portion of the body, which can extend between the second and third lateral walls.

In accordance with an exemplary embodiment, the present disclosure can be related to a bus bar 1 for electric power distribution, including a body made of conducting material, for example copper or aluminum, which can longitudinally extend along a principal axis 100.

The body, seen in a transversal section with respect to the principal axis 100, has a first side 40 and a second side 41 which can be transversally connected to each other by a third side 42 and a fourth side 43.

The body of the bus bar 1 can have, on the side 40, at least a first slot 3 and a second slot 4, which can be separated from each other and, which can be adapted for coupling with corresponding means for fixing the bus bar 1 to other elements and/or components, such as other bus bars 1 or supporting structures.

The slot 3 has a bottom portion 5 from which a lateral wall 6 and a lateral wall 7 protrude transversally facing to each other, and the second slot 4 has a bottom portion 10 from which a lateral wall 11 and a lateral wall 12 protrude transversally facing to each other.

Each one of the bottom portions 5 and 10 can include two substantially straight tracts 13 and 14 which form an angle less than 180° between them; for example, the two tracts 13 and 14 form between them an angle between 155° and 178°, for example between 160° and 175°, and for example between 165° and 172°. In the exemplary embodiments of FIGS. 1-14, the illustrated angle between the two tracts 13 and 14 can have a value of about 170°. The two straight tracts 13 and 14 can simplify the coupling between the slots 3 and 4 and the corresponding fixing means, for example, T-shaped bolts.

The lateral wall 11 of the slot 4 can be adjacent to the lateral wall 7 of the slot 3 along the transversal extension of the body with respect to the principal axis 100. The direction of such transversal extension of the body can be depicted in the attached Figures by an axis 200, which can be transversal to the principal axis 100.

For example, the walls 11 and 12 of the slot 4 can be substantially parallel to the walls 6 and 7 of the slot 3.

The body of the bus bar 1 according to the present disclosure, seen in the transversal cross-section of FIG. 1, can further include, on the side 41, at least one cavity 30 extending at least over a corresponding portion 25 of the body which can extend between the lateral wall 7 of the slot 3 and the adjacent lateral wall 11 of the slot 4.

According to the exemplary embodiments illustrated in FIGS. 1-14, the at least one cavity 30 can be defined at least by two delimiting portions 20-21, 70-71, 71-72 of the body, which can be arranged substantially transversal with respect to the bottom portions 5, 10 of the slots 3 and 4, and by a base portion 50 interposed between such two delimiting portions 20-21, 70-71, 71-72. For example, in practice, the extension of the cavity 30 along the transversal axis 200 can be delimited by the two delimiting portions 20-21, 70-71, 71-72.

According to the exemplary embodiments illustrated in FIGS. 1-4 and 10-13, the body of the bus bar 1 can include, on the side 41, only one cavity 30, which further extends over at least a corresponding tract the bottom portion 5 of the slot 3 and over at least a corresponding tract of the bottom portion 10 of the slot 4. For example, in practice, the extension of the slot 30 along the transversal axis 200 can be larger than the distance $D_1$ between the lateral wall 7 of the slot 3 and the adjacent lateral wall 11 of the slot 4.

In the exemplary embodiments illustrated in FIGS. 1-3 and 10-13, the base portion 50 of the cavity 30 can be substantially flat and arranged transversally with respect to the lateral walls 6, 7 of the slot 3 and the lateral walls 11, 12 of the slot 4; for example, the base portion 50 can be connected to the two transversal delimiting portions 20 and 21 by curved tracts 22 and 23 of the body of the bus bar 1.

According to the exemplary embodiment illustrated in FIG. 1, the delimiting portions 20 and 21 can be disposed relative to the slots 3 and 4 in such a way that the delimited extension of the cavity 30 along the transversal axis 200 can be narrower than or substantially equal to the maximum distance $D_2$ between the lateral wall 6 of the slot 3 and the lateral wall 12 of the slot 4.

In the exemplary embodiments illustrated in FIGS. 2-3 and 10-13, the delimiting portions 20 and 21 can be disposed relative to the slots 3 and 4 in such a way that the delimited extension of the cavity 30 along the transversal axis 200 can be larger than the maximum distance $D_2$. For example, in practice, the cavity 30 can extend further with respect to the slot 3 and to the slot 4 along the transversal axis 200.

Figure 2:
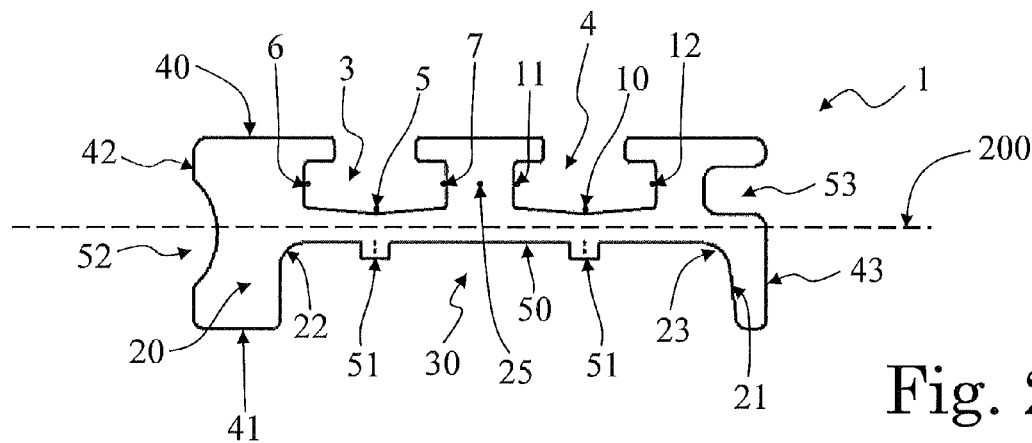
FIG. 2 is a sectional view of an exemplary bus bar according to the present disclosure.

According to the exemplary embodiment illustrated in FIG. 2, the body of the bus bar 1 can include at least two strips 51, which can protrude transversally from the base portion 50 and, which can be adapted to be used for coupling the bus bar 1 to other components and/or elements. For example, the strips 51 can provide bearing surfaces for a supporting element of the bus bar 1.

The bus bars 1 according to the exemplary embodiment illustrated in FIG. 1 can be adapted for carrying a nominal current of about 1250 A. The bus bar 1 according to the exemplary embodiment illustrated in FIGS. 2-3 can be adapted for carrying a nominal current of about 1400 A. The bus bar 1 according to the exemplary embodiment illustrated in FIGS. 10-11 can be adapted for carrying a nominal current of about 1100 A, and the bus bar 1 according to the exemplary embodiment illustrated in FIGS. 12-13 can be adapted for carrying a nominal current of about 1250 A.

Figure 4:
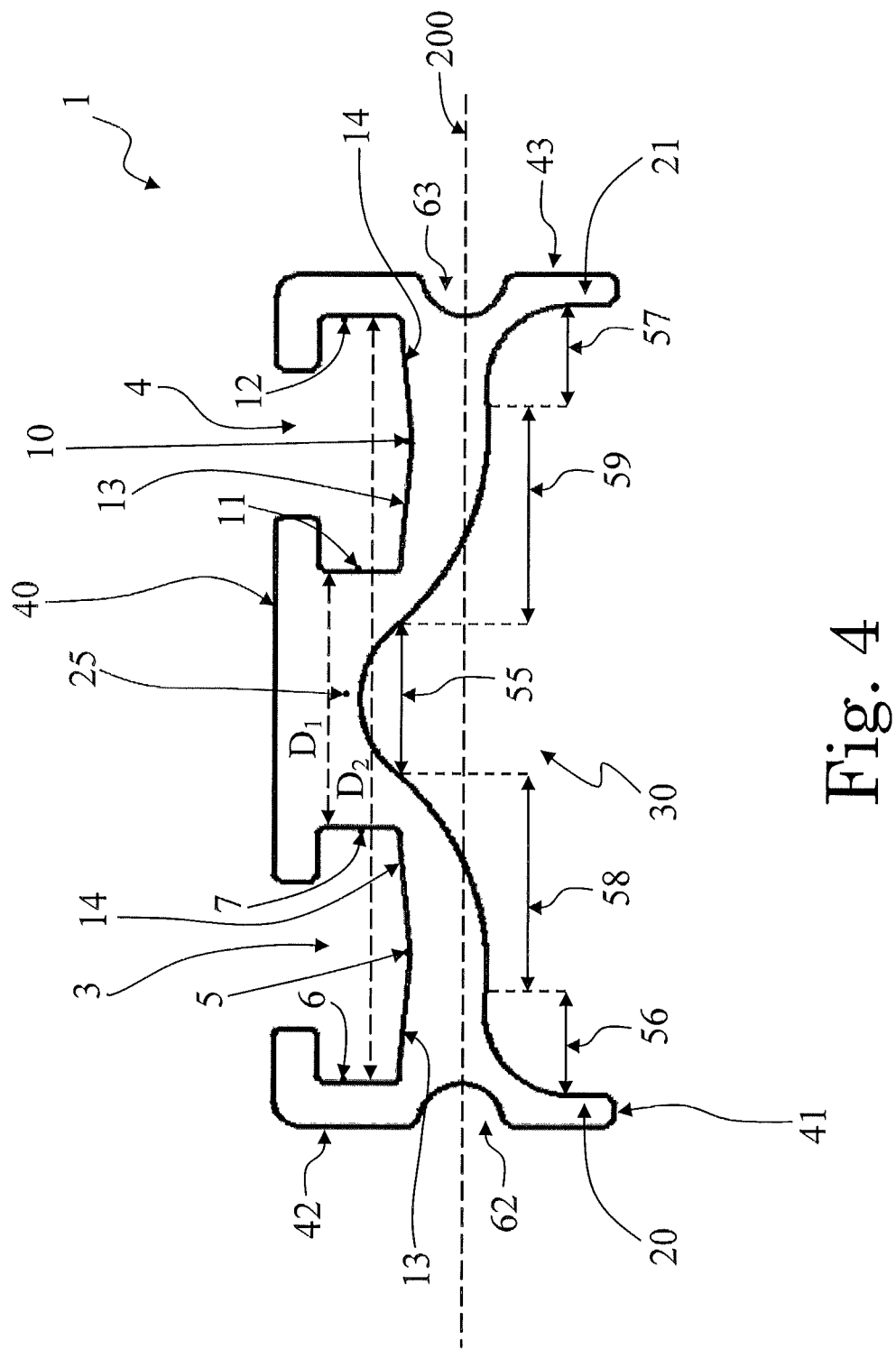
FIG. 4 is a sectional view of an exemplary bus bar according to the present disclosure.

According to the exemplary embodiment illustrated in FIG. 4, the base portion 50 of the cavity 30 can include at least a curved tract 55, which can extend over the corresponding portion 25 of the body of the bus bar 1.

In the exemplary embodiment illustrated in FIG. 4, such first curved tract 55 can be concave and the base portion 50 can further includes a second curved concave tract 56 connected to the delimiting portion 20, a third curved concave tract 57 connected to the delimiting portion 21, a curved convex tract 58 connecting the curved concave tracts 55 and 56 to each other, and a curved convex portion 59 connecting the curved concave tracts 55 and 57 to each other.

The delimiting portions 20 and 21 of the bus bar 1 illustrated in FIG. 4 can be disposed relative to the slots 3 and 4 in such a way that the delimited extension of the cavity 30 along the transversal axis 200 can be larger than the maximum distance $D_2$ between the lateral wall 6 of the slot 3 and the lateral wall 12 of the slot 4.

The bus bar 1 illustrated in FIG. 4 can be adapted for carrying a nominal current of about 1150 A.

The cavity 30 of the bus bar 1 according to the present disclosure can extend over the corresponding portion 25 of the body and between the lateral wall 7 of the slot 3 and the adjacent lateral wall 11 of the slot 4. For example, in the bus bar 1 illustrated in FIG. 4, the curved concave tract 55 of base portion 50 can be defined in such a way that the cavity 30 can extend over the corresponding portion 25 of the body and partially can extend between the lateral wall 7 of the slot 3 and the adjacent lateral wall 11 of the slot 4.

According to the exemplary embodiments illustrated in FIGS. 5-9, in addition to the at least one cavity 30, the body of the bus bar 1 can have, on side 41, at least one further cavity 150 and at least one further cavity 151, wherein the at least one cavity 30 can be defined between the further cavities 150 and 151. For example, the at least one further cavity 150 can extend over at least a corresponding tract of the bottom portion 5 of the slot 3, and the at least one further cavity 151 can extend over at least a corresponding tract of the bottom portion 10 of the slot 4.

Figure 5:
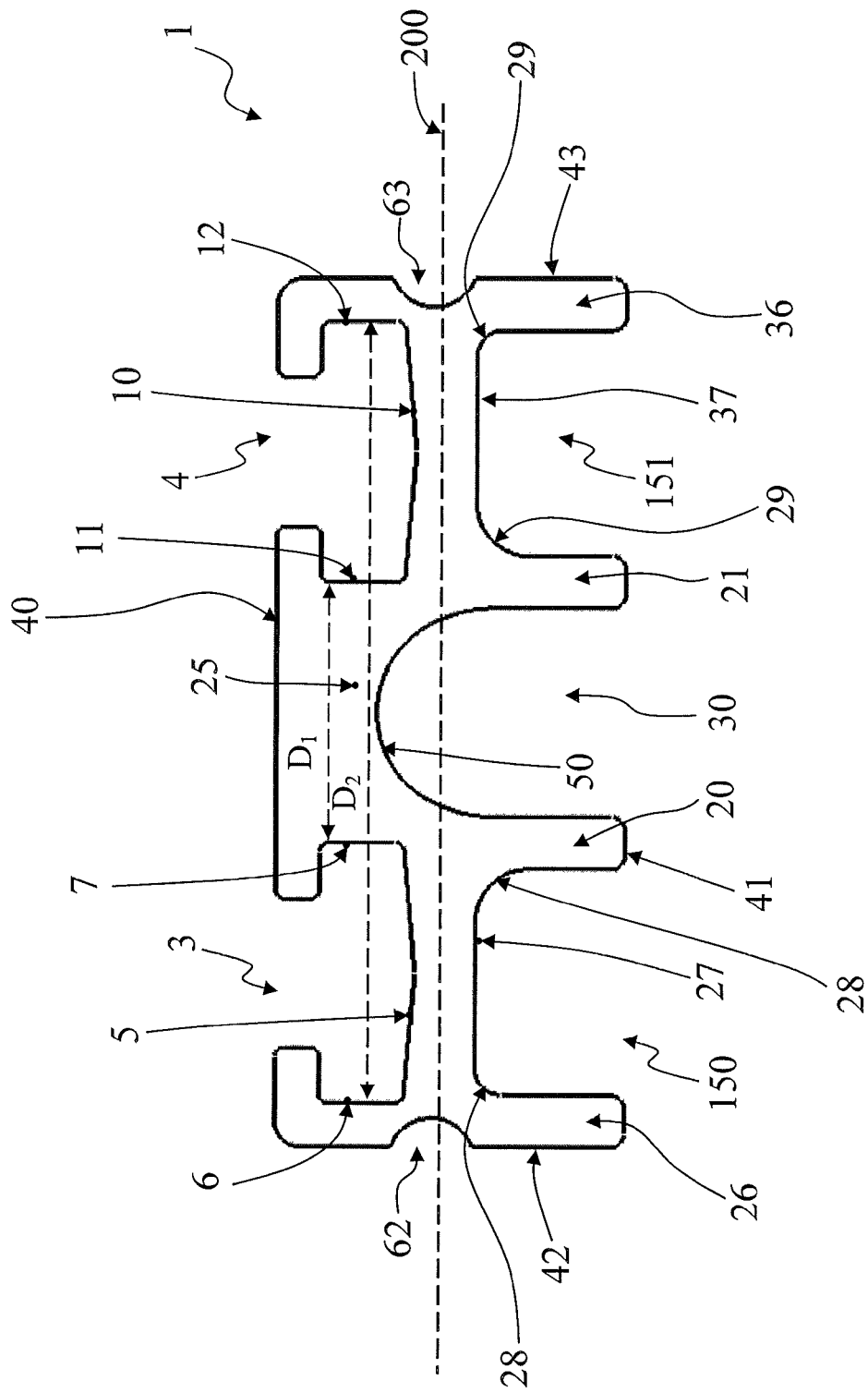
FIG. 5 is a sectional view of an exemplary bus bar according to the present disclosure.
Figure 8:
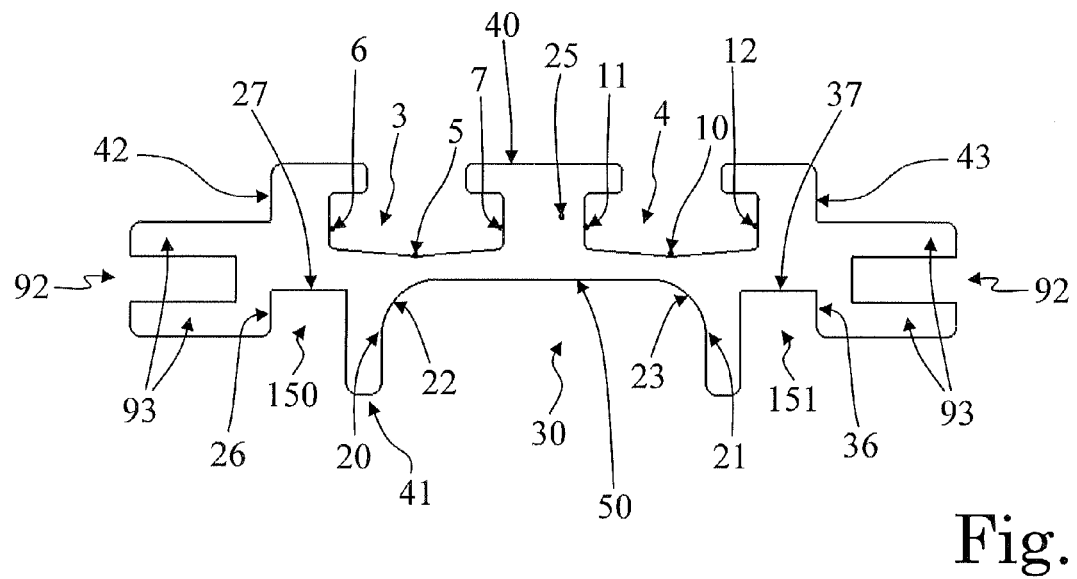
FIG. 8 is a sectional view of an exemplary bus bar according to the present disclosure.
Figure 9:
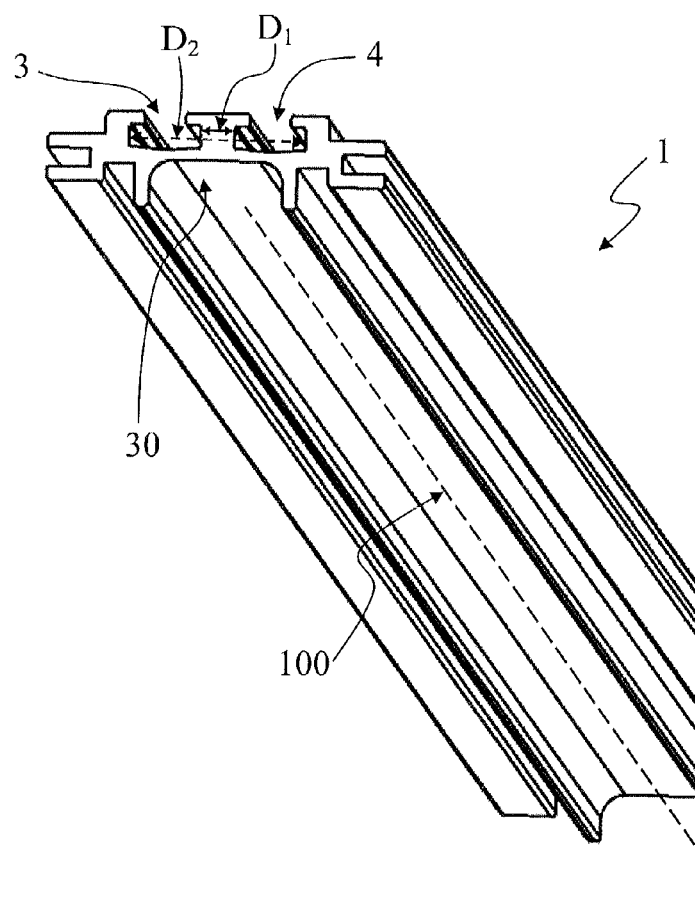
FIG. 9 is a perspective view of the exemplary bus bar as shown in FIG. 8 according to the present disclosure.

In the exemplary embodiments illustrated in FIG. 5 and in FIGS. 8-9, the body can have, on side 41, only one cavity 30 defined between one cavity 150 and one cavity 151.

In the bus bar 1 illustrated, for example, in FIG. 5, the cavity 30 can extend over the corresponding portion 25 of the body of the bus bar 1. For example, the two delimiting portions 20 and 21 of the bus bar 1 can be positioned relative to the slots 3 and 4 in such a way that the delimited extension of the slot 30 along the transversal axis 200 can be narrower than the distance $D_1$ between the lateral wall 7 of the slot 3 and the adjacent lateral wall 11 of the slot 4.

The base portion 50 of the illustrated cavity 30 can be a curved concave portion 50, which can connect the two delimiting portions 20 and 21 to each other. For example, such curved portion 50 can be defined in such a way that the cavity 30 can extend partially between the lateral wall 7 of the slot 3 and the adjacent lateral wall 11 of the slot 4.

The cavity 150 can extend over the bottom portion 5 of the slot 3. For example, the cavity 150 can be delimited by: the delimiting portion 20 (the same delimiting also the cavity 30); a further delimiting portion 26 of the body which can be arranged substantially transversal with respect to the bottom portion 5 of the slot 3; a substantially flat base wall 27; and two curved portions 28 which can connect the base wall 27 to the delimiting portions 20 and 26.

The cavity 151 can extend over the bottom portion 10 of the slot 4. For example, the cavity 151 can be delimited by: the delimiting portion 21 (the same delimiting also the cavity 30); a further delimiting portion 36 of the body which can be arranged substantially transversal with respect to the bottom portion 10 of the slot 4; a substantially flat base 37; and two curved portions 29 which can connect the flat base 37 to the delimiting portions 21 and 36.

The bus bar 1 illustrated in FIG. 5 can be adapted for carrying a nominal current in the range of about 1350 A.

In the exemplary embodiment illustrated in FIGS. 8 and 9, the cavity 30 can extend over a corresponding tract of the bottom portion 5 of the slot 3 and over a corresponding tract of the bottom portion 10 of the slot 4. For example, the two delimiting portions 20 and 21 of the bus bar 1 can be positioned relative to the slots 3 and 4 in such a way that the delimited extension of the slot 30 along the transversal axis 200 can be larger than the distance $D_1$ between the lateral wall 7 of the slot 3 and the adjacent lateral wall 11 of the slot 4, and narrower than the distance $D_2$ between the lateral wall 6 of the slot 3 and the lateral wall 12 of the slot 4.

The base portion 50 of the illustrated cavity 30 can be substantially flat and can be connected to the delimiting portions 20 and 21 by the two curved tracts 22 and 23 of the body of the bus bar 1.

The cavity 150 of the bus bar 1 illustrated in FIGS. 8 and 9 can be delimited by: the transverse portion 20 (the same delimiting also the cavity 30); a further delimiting portion 26 of the body which can be arranged substantially transversal with respect to the bottom portion 5 of the slot 3; and a substantially flat base wall 27 connecting the delimiting portions 20 and 26 to each other.

The cavity 151 can be delimited by the transverse portion 21 (the same delimiting also the cavity 30), a further delimiting portion 36 of the body which can be arranged substantially transversal with respect to the bottom portion 10 of the slot 4, and a substantially flat base 37 connecting the delimiting portions 21 and 36 to each other.

The bus bar 1 illustrated in FIGS. 8 and 9 can be adapted for carrying a nominal current in the range of about 1600 A.

Figure 6:
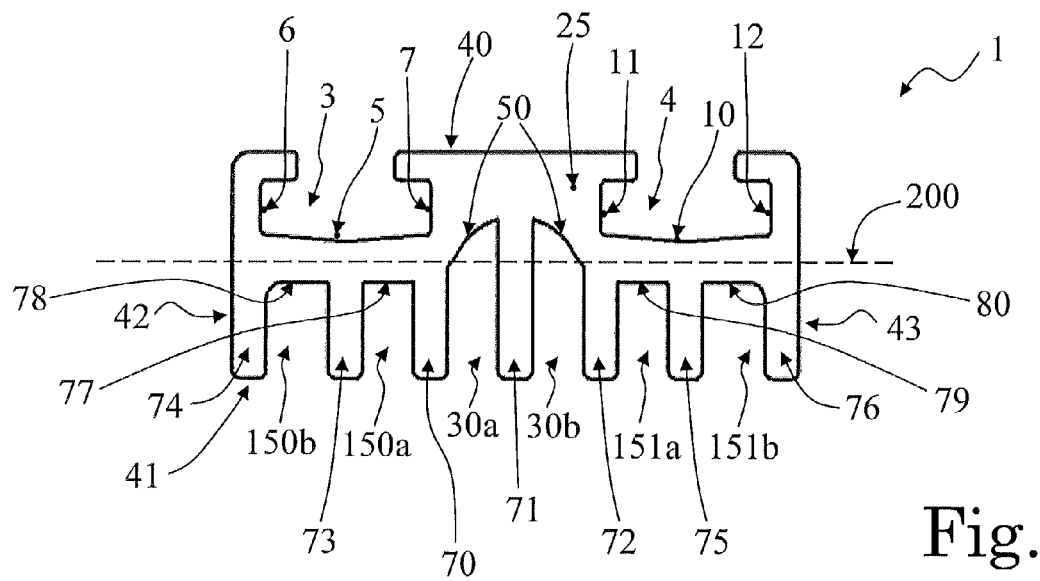
FIG. 6 is a sectional view of an exemplary bus bar according to the present disclosure.
Figure 7:
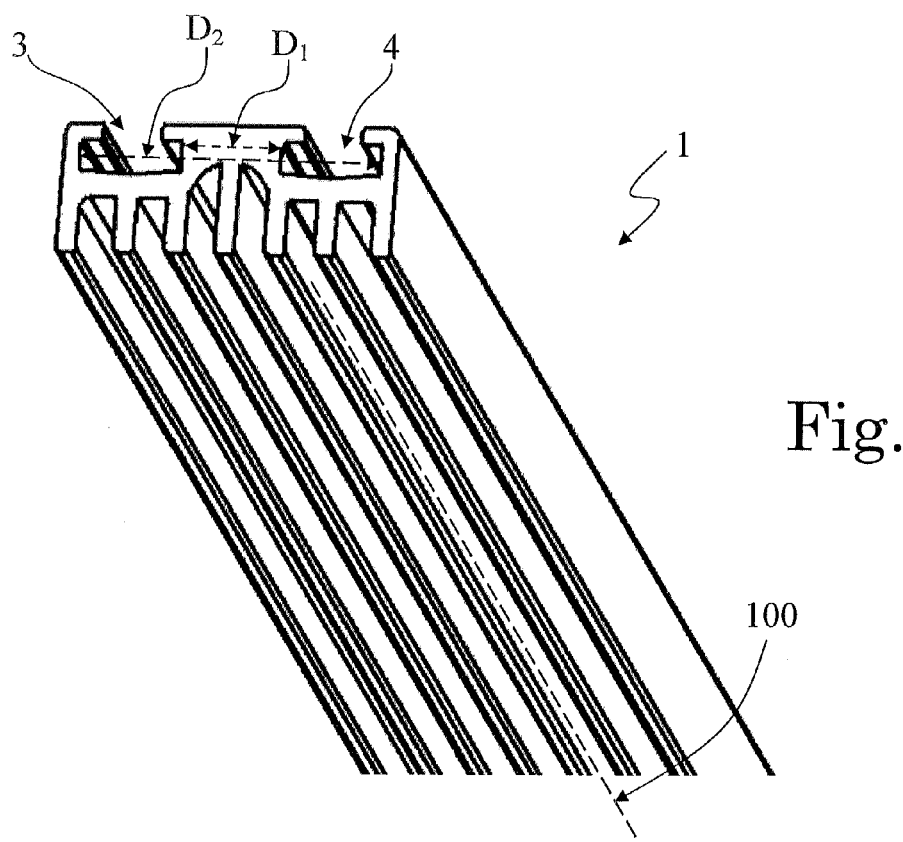
FIG. 7 is a perspective view of the exemplary bus bar as shown in FIG. 6 according to the present disclosure.

According to the exemplary embodiment illustrated in FIGS. 6 and 7, the at least one cavity 30 of the bus bar 1 can include a plurality of cavities 30a, 30b, which can be defined between corresponding spaced fins 70, 71, 72 of the body of the bus bars 1. The spaced fins 70, 71, 72 can be arranged substantially transversal with respect to the bottom portions 5 and 10 of the slots 3 and 4 and can be, for example, parallel to each other.

For example, the at least one further cavity 150 can include a plurality of cavities 150a, 150b, which can be defined between corresponding spaced fins 70, 73, 74 of the body of the bus bar 1. The fins 70, 73, 74 can be arranged substantially transversal with respect to the bottom portion 5 of the slot 3 and can be, for example, parallel to each other. The at least one further cavity 151 can include a plurality of cavities 151a, 151b, which can be defined between corresponding spaced fins 72, 75, 76 of the body of the bus bar 1. The fins 72, 75, 76 can be arranged substantially transversal with respect to the bottom portion 10 of the slot 4 and can be, for example, parallel to each other.

The bus bar 1 illustrated for example in FIGS. 6-7 can include two cavities 30a, 30b defined between the three spaced and parallel fins 70, 71, 72.

For example, the cavity 30a can be delimited by the fin 70, the fin 71 disposed adjacent to the fin 70 along the transversal axis 200, and the base portion 50 connecting transversally the two adjacent fins 70, 71. The cavity 30b can be delimited by the fin 71, the fin 72 disposed adjacent to the fin 71 along the transversal axis 200, and the base portion 50 connecting transversally the two adjacent fins 71, 72.

The base portion 50 of each one of the cavities 30*a* and 30*b* can be curved, for example, the base portion 50 of the cavity 30*a* can have a concavity facing the cavity 30*b*, and the base portion 50 of the cavity 30*b* can have a concavity facing the cavity 30*a*.

These curved base portions 50 can be defined in such a way that the cavities 30*a* and 30*b* can extend partially between the lateral wall 7 of the slot 3 and the adjacent lateral wall 11 of the slot 4.

Furthermore, the bus bar 1 illustrated in FIGS. 6 and 7 can include: the two cavities 150*a*, 150*b* defined between the three spaced and parallel fins 70, 73 and 74; and the two cavities 151*a*, 151*b* defined between the three spaced and parallel fins 72, 75 and 76.

For example, the cavity 150*a* can be delimited by: the fin 70 (the same also delimiting the cavity 30*a*), the fin 73 disposed adjacent to the fin 70 along the transversal axis 200, and the base wall 77 connecting the adjacent fins 70 and 73 to each other. The cavity 150*b* can be delimited by the fin 73, the fin 74 disposed adjacent to the fin 73 along the transversal axis 200, and the base wall 78 connecting the adjacent fins 73 and 74 to each other.

The cavity 151*a* can be delimited by: the fin 72 (the same also delimiting the cavity 30*b*), the fin 75 disposed adjacent to the fin 72 along the transversal axis 200, and the base wall 79 connecting the adjacent fins 72 and 75 to each other. The cavity 151*b* can be delimited by the fin 75, the fin 76 disposed adjacent to the fin 75 along the transversal axis 200, and the base wall 80 connecting the adjacent fins 75 and 76 to each other.

In the exemplary embodiment illustrated in FIGS. 6-7, the body of the bus bar 1 can include the seven spaced fins 70-76 for defining the six cavities 30*a*, 30*b*, 150*a*, 150*b*, 151*a*, 151*b* on the side 41, it can be set forth that the number of spaced fins, and hence the number of cavities defined between such fins, can be different with respect to the illustrated one. For example, the number of cavities 30 and/or of cavities 150 and/or cavities 151 can be greater that two, for example the body of the bus bar 1 can have, on side 41, three or more cavities 30 and/or three or more cavities 150 and/or three or more cavities 151 defined between corresponding spaced fins.

The bus bar 1 illustrated in FIGS. 6 and 7 can be adapted for carrying a nominal current in the range of about 1800 A.

According to the exemplary embodiments illustrated in FIGS. 2-5, at least one of the side 42 and the side 43 of the body of the bus bar 1 can include a recess. For example, the body of the bus bar 1 illustrated in FIG. 2 can include, on side 42 and on side 43, recesses 52 and 53, respectively, and the body of the bus bars 1 illustrated in FIGS. 4 and 5 has, on sides 42 and on side 43, recesses 62 and 63, respectively.

According to the exemplary embodiments illustrated in FIGS. 8-14, the body of the bus bar 1 can include a first coupling portion and a second coupling portion which can protrude from the side 42 and the side 43, respectively, and which can be adapted to couple the bus bar 1 to associable components and or elements, such as an insulating supporting element 500 for the bus bar 1.

Figure 10:
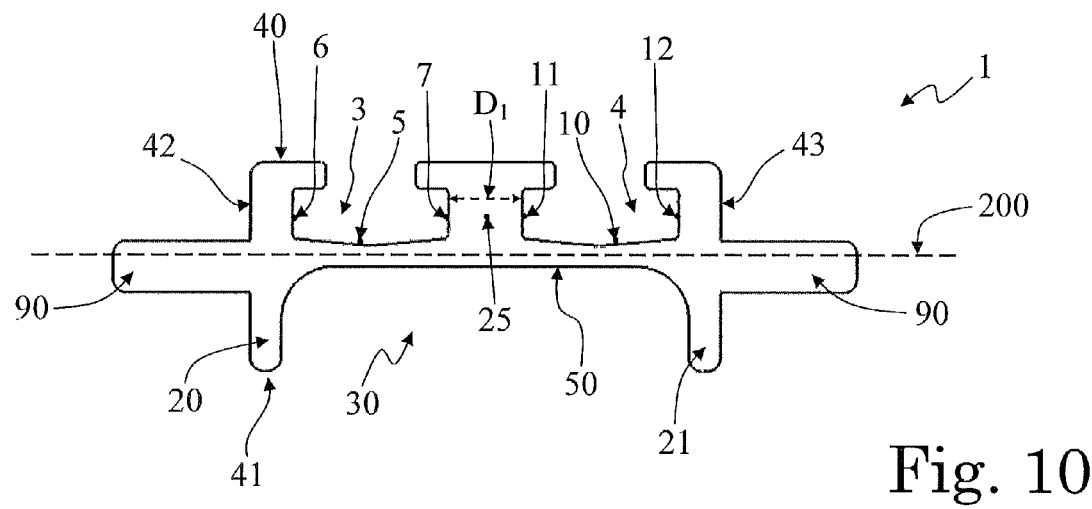
FIG. 10 is a sectional view of an exemplary bus bar according to the present disclosure.
Figure 11:
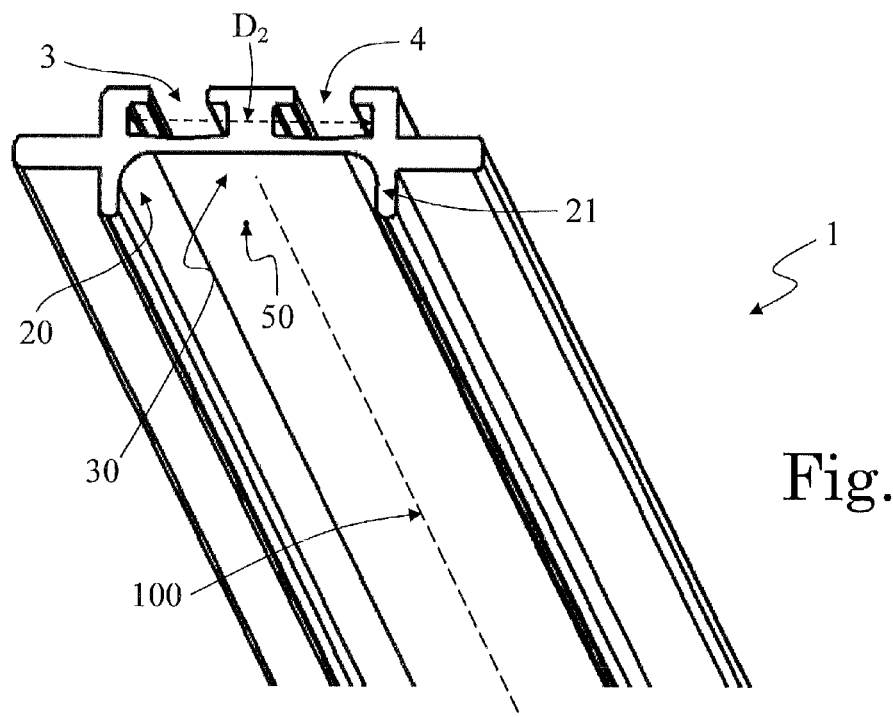
FIG. 11 is perspective view of the exemplary bus bar as shown in FIG. 10 according to the present disclosure.
Figure 12:
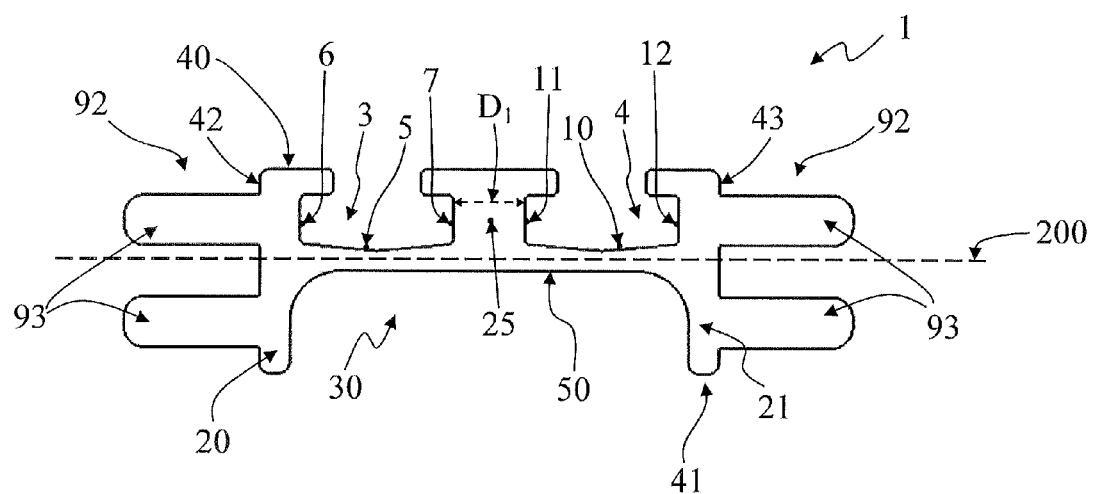
FIG. 12 is a sectional view of an exemplary bus bar according to the present disclosure.
Figure 13:
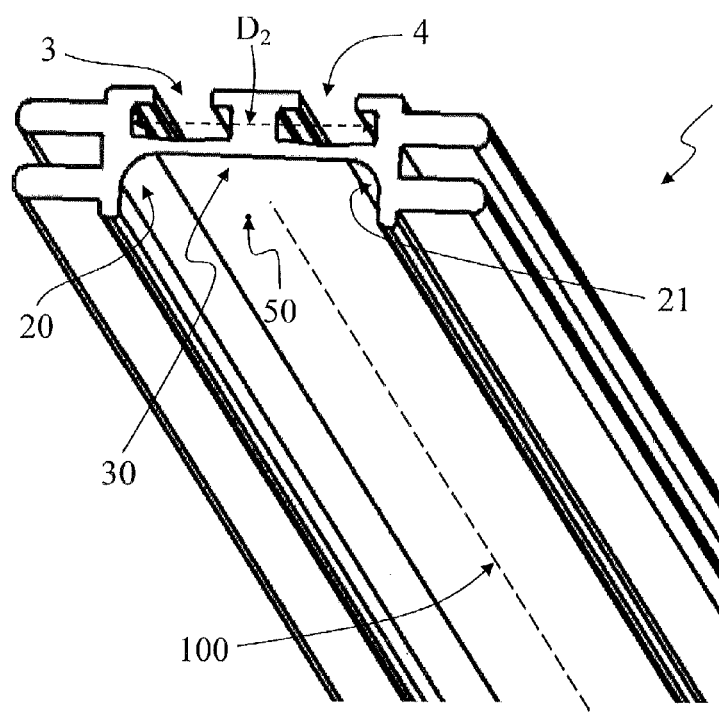
FIG. 13 is a perspective view of the exemplary bus bar as shown in FIG. 12 according to the present disclosure.

In the exemplary embodiment illustrated in FIG. 10, the first coupling portion of the bus bar 1 can include a single tab 90 which can transversally protrude from the side 42 of the body, so as to be arranged substantially transversally with respect to the lateral walls 6, 7 of the slot 3; the second coupling portion can include a single tab 90, which can transversally protrude from the side 43 of the body so as to be arranged substantially transversally with respect to the lateral walls 11 and 12 of the slot 4.

For example, the tabs 90 can be adapted to be inserted into corresponding slots defined in the insulating supporting elements 500.

In the exemplary embodiments illustrated in FIGS. 8-9 and 12-14, each one of the first coupling portion and the second coupling portion can include a fork portion 92 adapted to receive therein a corresponding coupling portion of the insulating supporting element 500. For example, the fork portion 92 can be defined by two spaced and parallel tabs 93 which can be arranged substantially transversal with respect to the lateral walls 6, 7 of the slot 3 and to the lateral walls 11, 12 of the slot 4.

Figure 14:
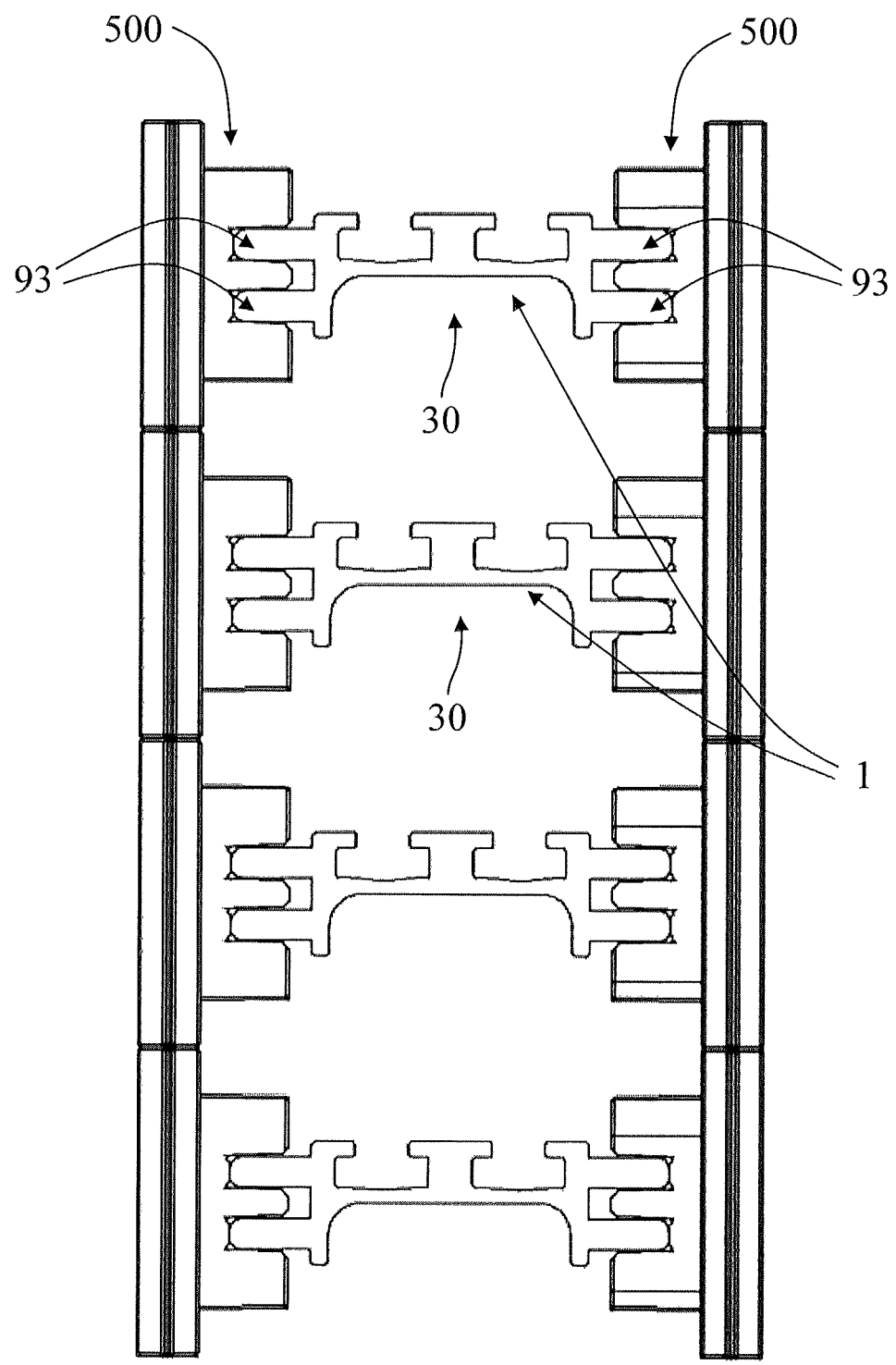
FIG. 14 illustrates four adjacent bus bars as shown in FIGS. 12 and 13, each one coupled to two corresponding insulating supporting elements.

FIG. 14 illustrates four bus bars 1, each one coupled with two corresponding insulating support elements 500. For example, each of the fork portions 92 can have its tabs 93 inserted into two slots of the corresponding insulating element 500.

For example, with respect to known bus bars, the presence of at least one slot 30 on side 41 of the body of the bus bar 1 can provide a reduction of the conductive material, at least over a portion of the body extending between the lateral wall 7 of the slot 3 the adjacent lateral wall 11 of the slot 4.

Experimental tests have demonstrated that this reduction of conducting material improves the heat dissipation capability of the bus bar 1.

The experimental tests have also demonstrated that this reduction of conducting material does not jeopardize the current conducting capability of the bus bar 1. For example, an improved heat dissipation of the bus bar 1 can means less losses for the electrical current flowing therethrough. For this reason, a relevant increasing of the heat dissipation can improve the current conducting capability, which can mean that the bus bar 1 can conduct nominal currents greater that the currents conducted by known bus bars, even having a reduced amount of conducting material with respect to such known bus bars.

Furthermore, the reduction of conducting material can provide a reduction of the weight and of the production costs of such bus bar 1.

With reference to the above described exemplary embodiments, the heat dissipation of the bus bar 1 can be improved by having one cavity 30 largely transversally extending along the axis 200 (at least over the corresponding portion 25 of the body of the bus bar 1 and further over the bottom portions 5 and 10 of the slots 3 and 4, as illustrated, for example, in FIGS. 1-4 and 8-13) and/or extending partially between the lateral wall 7 of the slot 3 and the adjacent lateral wall 11 of the slot 4 (as illustrated, for example, in FIGS. 4, 5 and 7).

For example, the configuration of the cavity 30 according to the exemplary embodiment illustrated in FIG. 4 can result in a reduction of conducting material in the bus bar 1 and, for example, in high heat dissipation performances.

Alternatively, the heat dissipation can be improved by providing the side 41 of the bus bar 1 with further cavities 150, 151, in addition to at least one cavity 30 (as illustrated for example in FIGS. 5-9).

For example, the bus bar 1 illustrated, in FIGS. 6 and 7, the heat dissipation performances can increase due to the reduction of material and the large outer surface provided by the spaced fins 70-76.

The heat dissipation can be further increased by having the cavity 30 with at least one curved tract, because the curvature of such tract increases the outer surface of the bus bar 1. For example, the cavity 30 of the bus bars 1 illustrated in FIGS.

1-3 and 8-13 can include the two curved tracts 22 and 23. The cavity 30 of the bus bar 1 illustrated in FIG. 4 can include the curved tracts 55-59. The cavity 30 of the bus bar 1 illustrated in FIG. 5 can include the curved portion 50, and each of the cavities 30a and 30b of the bus bar 1 illustrated in FIG. 6 can include the curved portion 50.

Figure 3:
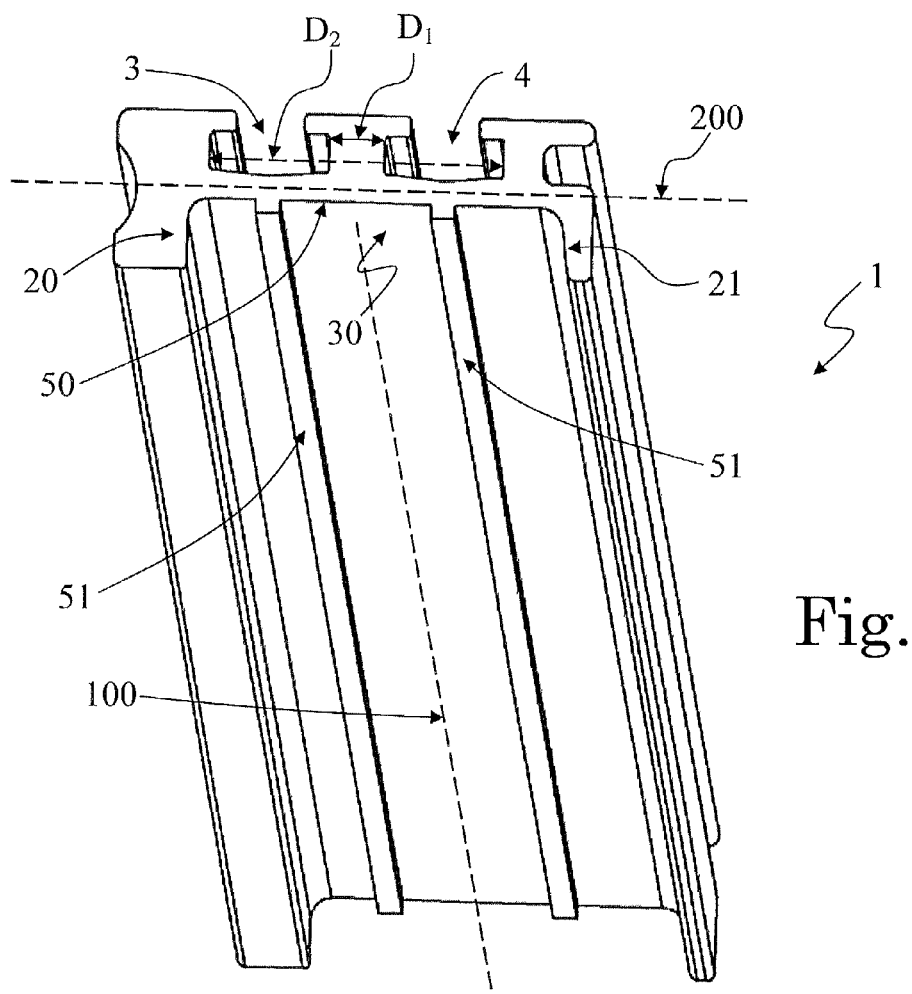
FIG. 3 is a perspective view of the exemplary bus bar as shown in FIG. 2 according to the present disclosure.

The heat dissipation can be further increased by having at least one recess defined in the side 42 and/or in the side 43 of the body of the bus bar 1, because such recess increases the outer surface of the bus bar 1 (see for example the bus bars 1 illustrated in FIGS. 3-5).

Furthermore, considering two bus bars 1 according to the above-described embodiments placed adjacent to each other, the reduction of conducting material on side 41 of the bus bar 1, due at least to the cavity 30, can reduce the magnetic forces applied to the bus bars 1 during the current flowing.

For example, the presence of a largely extending cavity 30 (see, for example, the exemplary embodiments of FIGS. 1-4, 10-13) or of a plurality of cavities 30, 150, 151 (see, for example, the exemplary embodiments of FIGS. 5-9) on the side 41 of the bus bars 1 can distribute the magnetic fields generated between the bus bars 1, directing them towards the outside of the bus bars 1.

This reduction of the magnetic forces can allow the bus bars 1 to bear rated short-time currents having a value greater with respect to known bus bars and, for example, can allow the reduction of the number and the dimensions of the supporting elements associated to the bus bars 1.

The bus bar 1 thus disclosed can be adapted for installation in power distribution switchboards, for example, for low voltage applications (for example, applications with a voltage up to 1000 V).

Such switchboards can include a plurality of switching devices, such as circuit breakers or other switching devices, which can be electrically connected to corresponding bus bars, at least one of which can be provided according to the above-described embodiments.

It should be noted that in the detailed description, identical or similar components, from a structural and/or functional point of view, can have the same reference numerals, regardless of whether they are shown in different embodiments. It should also be noted that in order to clearly and concisely describe the present disclosure, the drawings are not necessarily to scale and certain features of the disclosure are shown in somewhat schematic form.

Further, when the term "adapted" (shaped/configured/etc., . . . ) is used herein while referring to any component as a whole, or to any part of a component, or to a whole combinations of components, or even to any part of a combination of components, it has to be understood that it means and encompasses the structure, and/or configuration and/or shape and/or positioning of the related component or part thereof, or combinations of components or part thereof, such term refers to.

Further, the term "transversal" or "transversally" is used herein to describe the position of one or more first parts and/or components relative to other second parts and/or components, so as to encompass all the positions where such first parts and/or components are not parallel with respect to the other second parts and/or components; hence, the meaning of "transversal" or "transversally" is not in any way herein limited to the particular case where such first parts and/or components are perpendicular to the second parts and/or components.

The bus bar 1 thus conceived can also be susceptible of modifications and variations, all of which are within the scope of the inventive concept as defined in particular by the appended claims; any possible combination of the previously disclosed embodiments can be implemented and has to be considered within the inventive concept of the present disclosure; all the details can furthermore be replaced with technically equivalent elements.

Also the materials used, so long as they are compatible with the specific use and purpose, as well as the dimensions, can be any according to the specification and the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A bus bar for electric power distribution in a power distribution switchboard, the bus bar comprising:
a body made of conducting material which longitudinally extends along a principal axis and which, seen in a transversal cross-section, has a first side and a second side transversally connected to each other by a third side and a fourth side;
the body having on the first side, at least a first slot and a second slot which are separated from each other and which are adapted to couple with corresponding means for fixing the bus bar to other elements and/or components;
the first slot having a first bottom portion from which a first lateral wall and a second lateral wall protrude transversally facing to each other, and the second slot having a second bottom portion from which a third lateral wall and a fourth lateral wall protrude transversally facing to each other;
wherein each of the first bottom portion and the second bottom portion includes two substantially straight tracts which form an angle of less than 180° between them;
wherein the third lateral wall is adjacent to the second lateral wall along a transversal extension of the body with respect to the principal axis;
wherein a first of the two substantially straight tracts of the first bottom portion forms an angle greater than 90° with the first lateral wall of the first slot, and a second of the two substantially tracts of the first bottom portion forms an angle greater than 90° with the second lateral wall of the first slot;
wherein a first of the two substantially straight tracts of the second bottom portion forms an angle greater than 90° with the third lateral wall of the second slot, and a second of the two substantially straight tracts of the second bottom portion forms an angle greater than 90° with the fourth lateral wall of the second slot; and
wherein the body has, on the second side, at least one cavity extending at least over a corresponding portion of the body, which extends between the second lateral wall and the third lateral wall.

2. The bus bar according to claim 1, wherein the at least one cavity further extends over at least a corresponding tract of the first bottom portion and over at least a corresponding tract of the second bottom portion.

3. The bus bar according to claim 1, wherein the at least one cavity comprises:
a plurality of cavities, which are defined between corresponding spaced fins of the body.

4. The bus bar according to claim 1, wherein the body has on the second side, at least one further first cavity and at least one further second cavity, and wherein the at least one cavity is defined between the at least one further first cavity and the at least one further second cavity.

5. The bus bar according to claim 4, wherein the at least one further first cavity comprises:
a plurality of first cavities defined between corresponding first spaced fins of the body.

6. The bus bar according to claim 5, wherein the at least one further second cavity comprises:
a plurality of second cavities defined between corresponding second spaced fins of the body.

7. The bus bar according to claim 1, wherein the at least one cavity extends at least partially between the second lateral wall and the third lateral wall.

8. The bus bar according to claim 1, wherein the at least one cavity is defined at least by two delimiting portions of the body arranged substantially transversal with respect to the first and second bottom portions, and by a base portion interposed between the two delimiting portions.

9. The bus bar according to claim 8, wherein the base portion is substantially flat and arranged transversally with respect to the first, second, third and fourth lateral walls.

10. The bus bar according to claim 9, wherein the base portion is connected to the two delimiting portions by curved tracts of the body.

11. The bus bar according to claim 8, wherein the base portion comprises:
at least a first curved tract, which extends over the corresponding portion of the body.

12. The bus bar according to claim 11, wherein the first curved tract is concave and the base portion comprises:
a second curved concave tract and a third curved concave tract, which are each connected to a corresponding one of the two delimiting portions of the body;
a first curved convex tract connecting the first and second curved concave tracts to each other; and
a second curved convex tract connecting the first and third curved concave tracts to each other.

13. The bus bar according to claim 1, wherein the body comprises:
a first coupling portion and a second coupling portion protruding from the third side and the fourth side, respectively, the first and second coupling portions being configured to couple the bus bar to associable elements and/or components.

14. The bus bar according to claim 13, wherein at least one of the first and second coupling portions comprises:
a fork portion adapted to be coupled to a supporting insulating element for the bus bar.

15. The bus bar according to claim 1, wherein at least one of the third side and fourth side comprises:
a recess.

16. The bus bar according to claim 1, comprising:
a corresponding fixing means adapted for coupling to the first and the second slots.

17. An electrical power distribution switchboard, the switchboard comprising:
at least one bus bar, the at least one bus bar comprising:
a body made of conducting material which longitudinally extends along a principal axis and which, seen in a transversal cross-section, has a first side and a second side transversally connected to each other by a third side and a fourth side;
the body having on the first side, at least a first slot and a second slot which are separated from each other and adapted for coupling with a corresponding means for fixing the bus bar to other elements and/or components;
the first slot having a first bottom portion from which a first lateral wall and a second lateral wall protrude transversally facing to each other, and the second slot having a second bottom portion from which a third lateral wall and a fourth lateral wall protrude transversally facing to each other;
wherein each of the first bottom portion and the second bottom portion includes two substantially straight tracts which form an angle of less than 180° between them;
wherein the third lateral wall is adjacent to the second lateral wall along a transversal extension of the body with respect to the principal axis;
wherein a first of the two substantially straight tracts of the first bottom portion forms an angle greater than 90° with the first lateral wall of the first slot, and a second of the two substantially tracts of the first bottom portion forms an angle greater than 90° with the second lateral wall of the first slot;
wherein a first of the two substantially straight tracts of the second bottom portion forms an angle greater than 90° with the third lateral wall of the second slot, and a second of the two substantially straight tracts of the second bottom portion forms an angle greater than 90° with the fourth lateral wall of the second slot; and
wherein the body has, on the second side, at least one cavity extending at least over a corresponding portion of the body, which extends between the second lateral wall and the third lateral wall.

18. The switchboard according to claim 17, wherein the at least one cavity further extends over at least a corresponding tract of the first bottom portion and over at least a corresponding tract of the second bottom portion.

19. The switchboard according to claim 17, wherein the at least one cavity comprises:
a plurality of cavities, which are defined between corresponding spaced fins of the body.

20. The switchboard according to claim 17, wherein the body has on the second side, at least one further first cavity and at least one further second cavity, and wherein the at least one cavity is defined between the at least one further first cavity and the at least one further second cavity.

21. The bus bar according to claim 1, wherein the angle between the two substantially straight tracts on each of the first and the second bottom portions is between 155° and 178°.

22. The switchboard according to claim 17, wherein the angle between the two substantially straight tracts on each of the first and the second bottom portions is between 155° and 178°.

* * * * *